United States Patent
Kato et al.

[11] Patent Number: 5,174,137
[45] Date of Patent: Dec. 29, 1992

[54] APPARATUS FOR DETECTING ABNORMALITY IN SPEED CHANGING SYSTEM

[75] Inventors: Takeo Kato, Kanagawa; Kohei Kusaka, Tokyo, both of Japan

[73] Assignee: Kabushiki Kaisha Komatsu Seisakusho, Tokyo, Japan

[21] Appl. No.: 775,994

[22] PCT Filed: Mar. 20, 1990

[86] PCT No.: PCT/JP90/00369
§ 371 Date: Nov. 20, 1991
§ 102(e) Date: Nov. 20, 1991

[87] PCT Pub. No.: WO91/14888
PCT Pub. Date: Oct. 3, 1991

[51] Int. Cl.$^5$ .................................. G01M 19/00
[52] U.S. Cl. ........................................ 73/118.1
[58] Field of Search ................... 73/118.1, 162; 364/424.03, 424.07

[56] References Cited

U.S. PATENT DOCUMENTS 4,700,563 10/1987 Iwata et al. .................... 73/118.1
5,109,696 5/1992 Bright et al. .................... 73/118.1

*Primary Examiner*—Jerry W. Myracle
*Attorney, Agent, or Firm*—Diller, Ramik & Wight

[57] ABSTRACT

An object of this invention consists in exactly specifically identifying the position where abnormality arises in a speed changing system installed on a construction machine or similar vehicle. Specifically, a microprocessor (29) determines whether or not clutches H and L and clutch R, 1st, 2nd, 3rd and 4th are brought in an engaged state in conformity with clutch pressure commands ($C_1$ to $C_7$). In addition, the microprocessor (29) determines whether or not the clutches are selected and then brought in an engaged state in conformity with the clutch pressure commands and shafts (2a, 7a and 8a) located before and behind the clutches are rotated in conformity with speed reduction ratios corresponding to the selected clutches. Thereafter, the microprocessor (29) exactly specifically identifies based on the results derived from the aforementioned determinations the position where a failure arises in the speed changing system. In other words, the microprocessor (29) determines whether the failure arises in an electrical system (sensors 9, 11 and 19 to 20) or in a mechanical system (clutch valves 12, 13 and 14 to 18). The apparatus of the present invention is preferably used by installing it on a vehicle such as a construction machine or the like.

3 Claims, 5 Drawing Sheets

APPARATUS FOR DETECTING ABNORMALITY IN SPEED CHANGING SYSTEM

TECHNICAL FIELD

The present invention relates to an apparatus for detecting abnormality which arises at a certain position in a speed changing system for a movement machine, a construction machine or the like.

BACKGROUND ART

FIG. 6 is a block diagram which schematically illustrates by way of example the structure of a conventional apparatus for detecting abnormality in a speed changing system.

As shown in the drawing, an output from an engine 41 is transmitted to a transmission 43 via a torque converter 42, and an output from the transmission 43 is then transmitted to driving wheels 44 via a differential gear unit and a speed reducing unit at a final stage both of which are not shown in the drawing.

The engine 41 is equipped with an engine rotation sensor 45 from which a signal is inputted into a controller 46 corresponding to the present rotational speed of the engine 41. In addition, each of the driving wheels 44 is equipped with a vehicle speed sensor 47 from which a signal is also inputted into the controller 46 corresponding to the present vehicle speed.

Subsequently, the controller 46 outputs a speed stage command to obtain a speed stage in conformity with the speed stage command so as to actuate a transmission clutch shift valve 48, causing a certain speed changing clutch in the transmission 43 to be selected and then brought in an engaged state.

Conventionally, the speed changing system is provided with an abnormality detecting apparatus for detecting abnormality of each of the engine rotation sensor 45 and the vehicle speed sensor 47 in response to outputs from these sensors 45 and 47.

This abnormality detecting apparatus is intended to detect the abnormality based on the result derived from comparison of an output from the engine rotation sensor 45 with an output from the vehicle speed sensor 47. For example, in a case where the present speed stage remains at a certain speed stage other than a neutral stage, the abnormality detecting apparatus determines whether an output from the engine rotation sensor 45 exceeds a threshold of 2500 r.p.m. or not, and moreover, determines whether an output from the vehicle speed sensor 47 is reduced to a level of zero kilometer or not. At this time, as shown in FIG. 7, when it is found that the output from the engine rotation sensor 45 exceeds the threshold of 2500 r.p.m. and the output from the vehicle speed sensor 47 is reduced to a level of zero kilometer, the abnormality detecting apparatus determines that "abnormality is present with respect to the vehicle speed sensor 47" (which represents that a vehicle speed signal system is abnormal).

Since the conventional abnormality detecting apparatus is constructed in the above-described manner, it makes the aforementioned determination on the assumption that the transmission clutch shift valve 48 is properly actuated and the speed changing clutch is properly brought in an engaged state.

When it is confirmed that the transmission clutch shifting valve 48 is properly actuated and the speed changing clutch is properly brought in an engaged state, it can be concluded that the aforementioned determination has been made correctly. However, in a case where the vehicle speed sensor 47 operates correctly but abnormality arises in a hydraulic system, there may be caused an occasion that an output from the engine rotation sensor 45 exceeds 2500 r.p.m. and an output from the vehicle speed sensor 47 is reduced to a level of zero kilometer even when the transmission clutch shift valve 48 fails to operate properly and the present speed changing stage in the transmission 43 remains still at a neutral stage. Also in this case, the abnormality detecting apparatus determines that "abnormality is present with respect to the vehicle sensor 47". This means that the abnormality detecting apparatus fails to exactly detects the practical position where the abnormality has arisen.

As is apparent from the above description, the conventional abnormality detecting apparatus has a problem that it is short of reliability, since it can not specifically identify the practical position where the abnormality has arisen.

The present invention has been made in consideration of the foregoing background and its object resides in providing an apparatus for detecting abnormality in a speed changing system wherein the apparatus assures that the position where abnormality arises in the speed changing system can specifically be identified with excellent accuracy.

DISCLOSURE OF THE INVENTION

According to the present invention, there is provided an apparatus for detecting abnormality in a speed changing system including a transmission composed of a plurality of speed changing clutches to perform a speed changing operation in response to a speed stage command so as to select one of the speed changing clutches and then bring it in an engaged state, wherein the apparatus comprises clutch engaged state detecting means arranged independently of the speed changing clutches to detect whether the speed changing clutch is brought in an engaged state or not; rotational speed detecting means for detecting a rotational speed of each of shafts located before and behind the speed changing clutches; clutch engaged state determining means for determining based on the content of the speed stage command in response to an output from the clutch engaged state detecting means with respect to each of the speed changing clutches whether or not the speed changing clutch is brought in an engaged state in conformity with the content of the speed stage command; rotational speed determining means for determining based on the content of the speed stage command in response to an output from the rotational speed detecting means whether or not one of the shafts located before and behind the speed changing clutches is rotated at a speed reduction ratio corresponding to the speed changing clutch which has been selected and then brought in an engaged state in conformity with the content of the speed stage command; and means for detecting based on the results derived from the determinations of the clutch engaged state determining means and the rotational speed determining means the position where the abnormality has arisen in the speed changing system.

With such construction as defined above, the practical position where the abnormality has arisen in the speed changing system of the apparatus can exactly be detected by combining the result derived from the determination of the clutch engaged state determining means with the results derived from the determination of the rotational speed determining means.

BEST MODE FOR CARRYING OUT THE INVENTION

Now, the present invention will be described in detail hereinafter with reference to the accompanying drawings which illustrate a preferred embodiment of the present invention.

Figure 1:
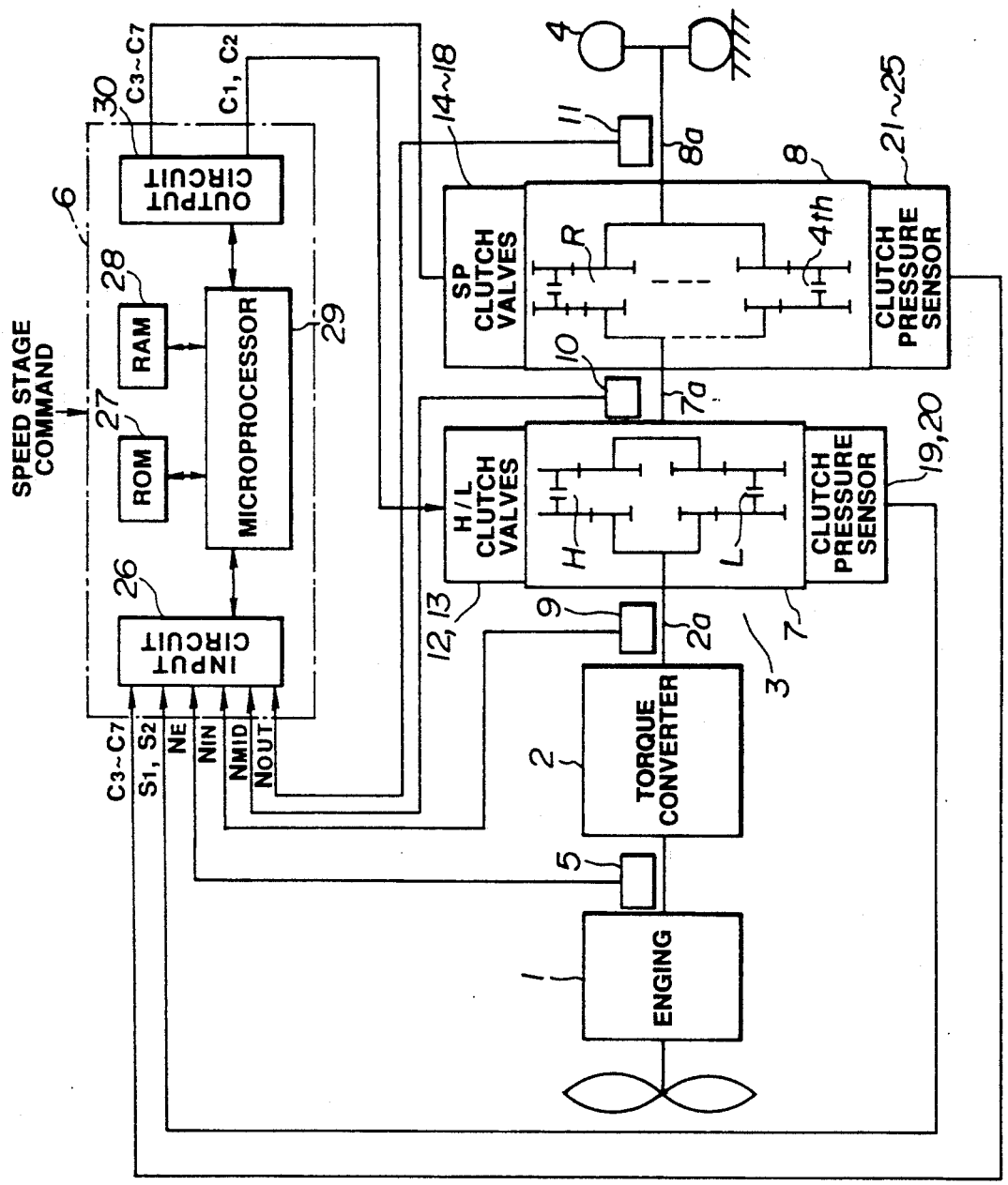
FIG. 1 is a block diagram which schematically illustrates the structure of an apparatus for detecting abnormality in a speed changing system in accordance with an embodiment of the present invention.

FIG. 1 is a block diagram which schematically illustrates the structure of an apparatus for detecting abnormality in a speed changing system in accordance with the embodiment of the present invention.

Referring to FIG. 1, an output from an engine 1 is transmitted to a transmission 3 via a converter 2, and an output from the transmission 3 is then transmitted to driving wheels 4 via a differential gear unit and a speed reducing unit at a final stage both of which are not shown in the drawing.

The engine 1 is equipped with an engine speed sensor 5 adapted to output a signal corresponding to an engine speed NE so that an output from the engine speed sensor 5 is inputted into a controller 6.

A speed changing command indicative of a speed stage to be assumed by the transmission 3 is inputted into the controller 6 from a shift selector which is not shown in the drawing.

The transmission 3 is essentially composed of an auxiliary speed changing unit 7 including speed changing clutchs H and L at a first stage (hereinafter referred to simply as H/L clutches) operatively connected to an output shaft 2$a$ of the torque converter 2 (hereinafter referred to simply as a transmission input shaft) and a main speed changing unit 8 including a speed changing clutch R (clutch for rearward movement) and first to fourth clutches 1st, 2nd, 3rd and 4th (hereinafter referred to simply as SP clutches) at a second stage operatively connected to an output shaft 7$a$ of the auxiliary speed changing unit 7 (hereinafter referred to simply as a transmission intermediate shaft) so as to selectively determine a speed stage by combination of one of the H/L clutches on the auxiliary speed changing unit 7 side with one of the SP clutches on the main speed changing unit 8 side.

The transmission input shaft 2$a$ is equipped with a transmission input shaft rotation sensor 9 for detecting a rotational speed $N_{IN}$ thereof, the transmission intermediate shaft 7$a$ is equipped with a transmission intermediate shaft rotation sensor 10 for detecting a rotational speed $N_{MID}$ thereof, and an output shaft 8$a$ of the main speed changing unit 8 (hereinafter referred to simply as a transmission output shaft) is equipped with a transmission output shaft rotation sensor 11 for detecting a rotational speed $N_{OUT}$ thereof so that the detected value $N_{IN}$ of the sensor 9, the detected value $N_{MID}$ of the sensor 10 and the detected value $N_{OUT}$ of the sensor 10 are inputted into the controller 6.

H/L clutch valves 12 and 13 each adapted to be actuated in response to an electric signal are separately hydraulically connected to the H/L clutches H and L so that the H/L clutches H and L are hydraulically controlled by the H/L clutch valves 12 and 13 hydraulically connected thereto.

Similarly, SP clutch valves 4 to 18 each adapted to be actuated in response to an electric signal are separately hydraulically connected to the SP clutches R, 1st, 2nd, 3rd and 4th so that the SP clutche R is separately controlled by the SP clutch valves 14 to 18 hydraulically connected thereto.

Each of the H/L clutch valves 12 and 13 and the SP clutch valves 14 to 18 includes a proportional solenoid (not shown) which serves as an actuator for displacing each spool so as to enable a hydraulic pressure to be generated in proportion to an intensity of driving electric current inputted into each proportional solenoid. The H/L clutch valves 12 and 13 and the SP clutch valves 14 to 18 are supplied with pressurized hydraulic oil from a hydraulic pump (not shown) via a main relief valve (not shown).

Clutch pressure command signals are inputted into the H/L clutch valves 12 and 13 and the SP clutch valves 14 to 18 from the controller 6 via a drive circuit (not shown) in order to shift desired clutches of the H/L clutches and the SP clutches to ON (engagement) or shift them to OFF (disengagement). Specifically, after clutch pressure command signals $C_1$, $C_2$ and $C_3$ to $C_7$ outputted from the controller 6 are amplified in the drive circuit, they are inputted into the H/L clutch valves 12 and 13 and the SP clutch valves 14 to 18. Thus, the foregoing clutch pressure command signals and an intensity of electric current flowing through each of the aforementioned solenoids are kept in the proportional relationship relative to each other.

In addition, the H/L clutches H and L are equipped with clutch pressure sensors 19 and 20 for detecting each clutch pressure exerted thereon, while the SP clutches R, 1st, 2nd, 3rd and 4th are equipped with clutch pressure sensors 21 to 25 for detecting each clutch pressure exerted thereon. The clutch pressure sensors 19, 20 and 21 to 25 are actuated such that they are turned on when the active clutch pressure is higher than a preset value (value substantially equal to ½ of a clutch set pressure), while they are turned off when the active clutch pressure is lower than the preset value. Signals $S_1$ and $S_2$ representing that the clutch pressure sensors 19 and 20 are turned on or off as well as signals $S_3$ to $S_7$ representing that the clutch pressure sensors 21 to 25 are turned on or off are inputted into the controller 6.

Figure 2:
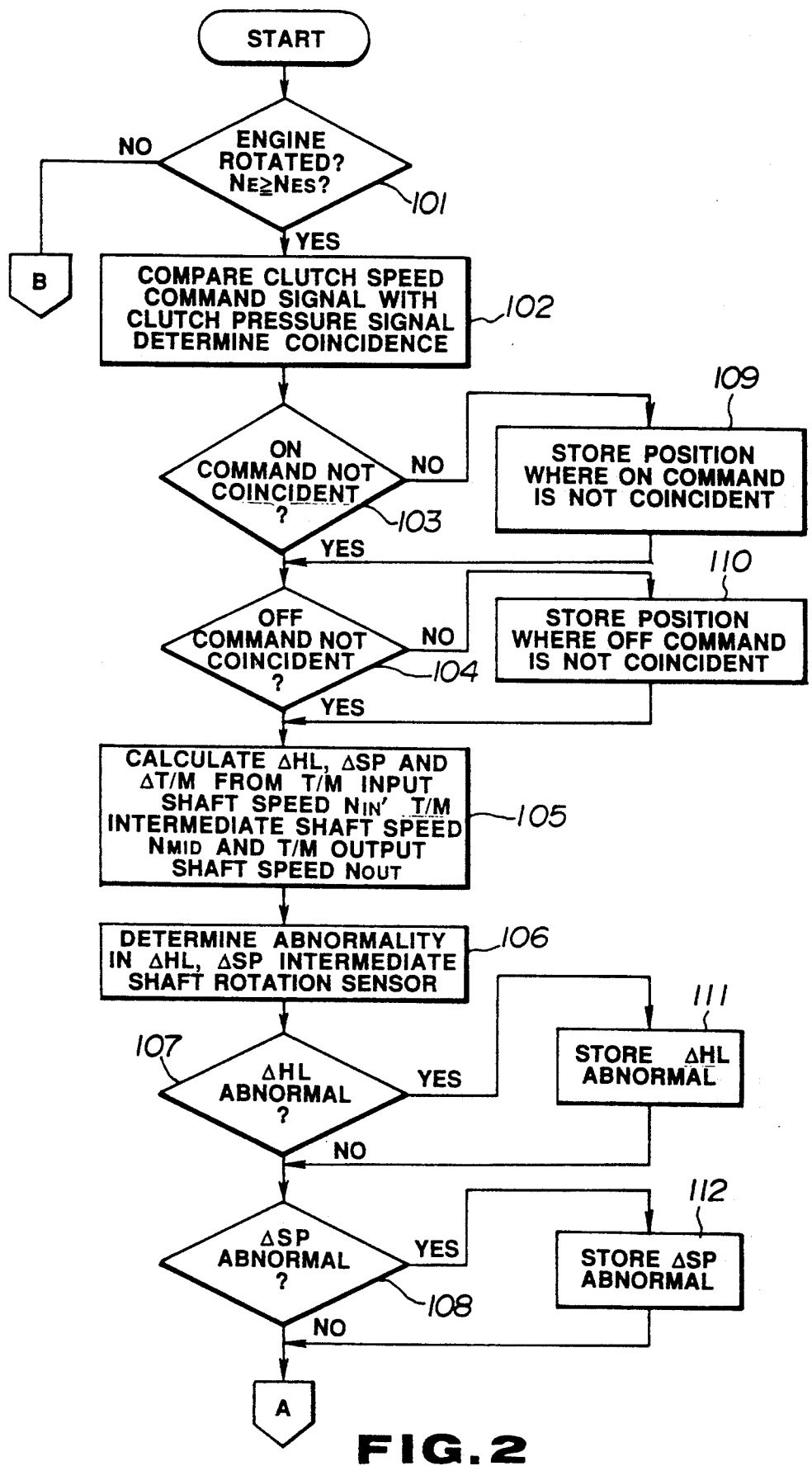
FIG. 2 is a flowchart which schematically illustrates a series of processings to be executed by the apparatus in accordance with a failure diagnosis routine.
Figure 3:
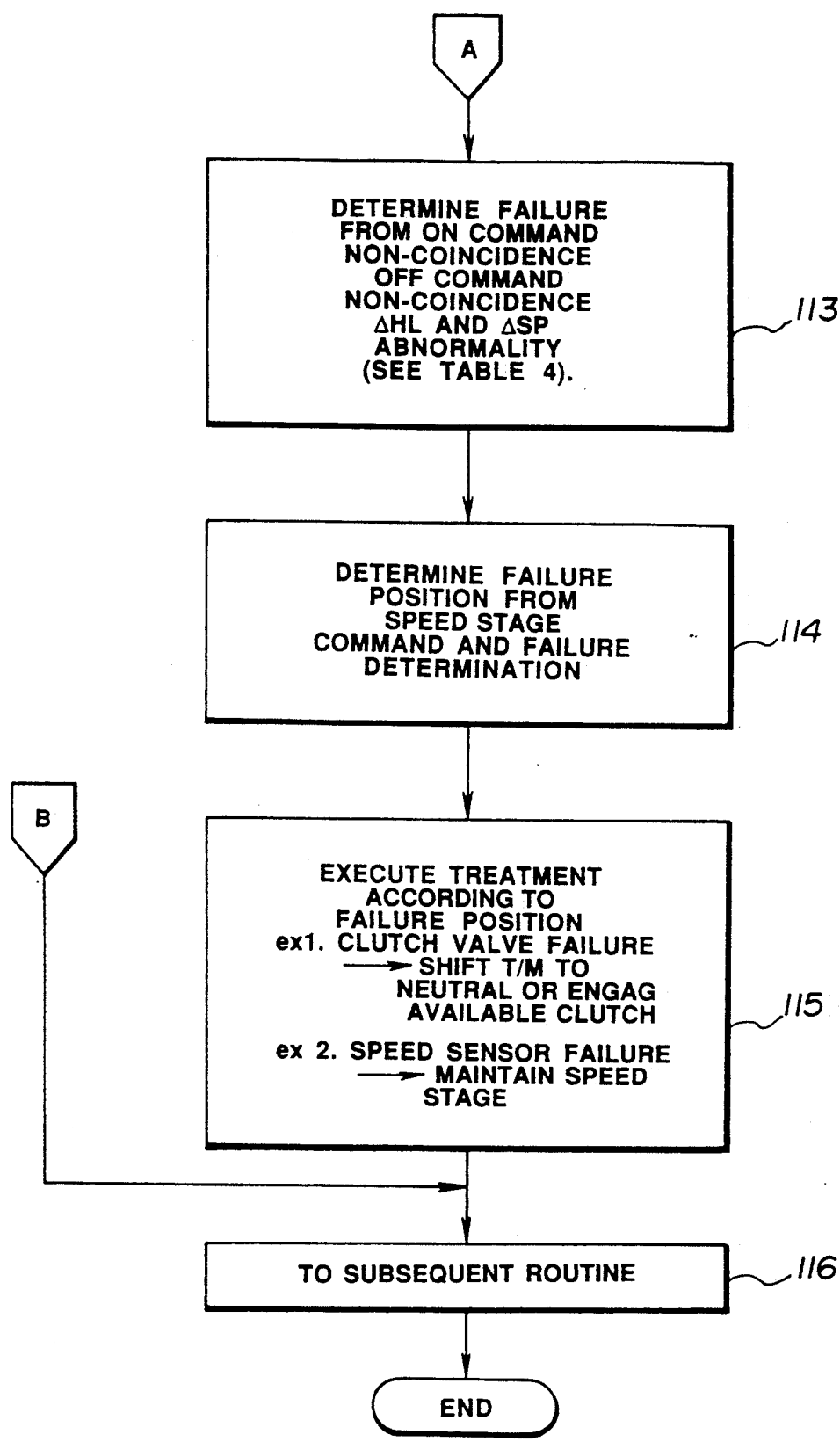
FIG. 3 is a flowchart which schematically illustrate another series of processings to be executed further by the apparatus in accordance with the diagnosis routine shown in FIG. 3, FIG. 4($a$) and FIG. 4($b$) are illustrative views which show determinations to be made by a controller in the apparatus, respectively, FIG. 5($a$), FIG. 5($b$) and FIG. 5($c$) are another illustrative views which show determinations to be made by the controller in the apparatus, respectively.

It should be noted that the aforementioned preset pressure is a threshold for determining whether the H/L clutches and the SP clutches are brought in an engaged state or released from the engaged state. As shown in FIG. 1, the controller 6 is essentially composed of an input circuit 26 into which the detection signals $S_1$ and $S_2$ of the clutch pressure sensors 19 and 20, the detection signals $S_3$ to $S_7$ of the clutch pressure sensors 21 to 25, the detection signal NE of the engine rotation sensor 5, the detection signal $N_{IN}$ of the transmission input shaft rotation sensor 9, the detection signal $N_{MID}$ of the transmission intermediate shaft rotation sensor 10 and the detection signal $N_{OUT}$ of the transmission output shaft rotation sensor 11 are inputted, a ROM 27 in which a flowchart for executing the content of items shown in Table 1 to Table 4 to be described later as well as a series of speed changing processings to be described later and a flowchart shown in FIG. 2 and FIG. 3 are memorized, a RAM 28 in which calculation equations (to be described later) required for executing a series of processings in accordance with the aforementioned flowcharts are memorized, a microprocessor 29 for executing the content of each flowchart based on the content of items memorized in the ROM 27 and the RAM 28 in response to the signals $S_1$, $S_2$, $S_3$ to $S_7$, NE, $N_{IN}$, $N_{MID}$ and $N_{OUT}$, and an output circuit 30 from which the clutch pressure command signals $C_1$, $C_2$, $C_3$ to $C_7$ are outputted to the H/L clutch valves 12 and 13 and the SP clutch valves 14 to 18 based on the results derived from a series of processings executed in the microprocessor 29.

Table 1 shows a relationship between the speed stages R, N (neutral), $F_1$ to $F_7$ selected by the shift selector and combination of the H/L clutches with the SP clutches corresponding to the selected speed stage.

TABLE 1

| speed stage | H/L clutch | SP clutch |
|---|---|---|
| R | L | R |
| N | | |
| $F_1$ | L | 1st |
| $F_2$ | L | 2nd |
| $F_3$ | H | 2nd |
| $F_4$ | L | 3rd |
| $F_5$ | H | 3rd |
| $F_6$ | L | 4th |
| $F_7$ | H | 4th |

The microprocessor 29 executes a certain speed changing processing based on the content of items shown in Table 1.

For example, when it is assumed that the speed stage command $F_1$ (first speed for forward movement) is inputted into the controller 6 by the shift selector, the H/L clutch L and the SP clutch 1st are selected, whereby an ON signal for bringing the H/L clutch L in an engaged state (which represents that the content of the clutch pressure command signal $C_2$ is ON) and an ON signal for bringing the SP clutch 1st in an engaged state (which represents that the content of the clutch pressure command signal $C_3$ is ON) are outputted from the output circuit 30, and moreover, an OFF signal for releasing all the remaining clutches from the engaged state (which represents that the content of each of the clutch pressure command signals $C_1$ and $C_4$ to $C_7$ is OFF) is outputted from the output circuit 30.

In a case where it is found that the H/L clutch valves 12 and 13 and the SP clutch valves 14 to 18 are correctly actuated in conformity with the content of the clutch pressure command signals $C_1$ to $C_7$, the H/L clutch L and the SP clutch 1st are brought in an engaged state and other clutches are released from the engaged state, resulting in correct speed changing (speed changing in conformity with the content shown in Table 1) being achieved. However, in a case where abnormality arises in the hydraulic system for actuating the respective clutches, there may be caused an occasion that speed changing fails to be achieved correctly. In addition, there may be caused an occasion that abnormality arises with the rotation sensors 9, 10 and 11 arranged corresponding to the respective shafts in the transmission 3 in which a speed changing operation is performed, resulting in correct detection failing to be carried out by the rotation sensors 9, 10 and 11. Additionally, there may be caused an occasion that abnormality arises with the clutch pressure sensors 19 and 20 and the clutch pressure sensors 21 to 25, resulting in correct detection failing to be carried out by the respective sensors 19 to 25.

In presumptive consideration of the aforementioned occasions, the microprocessor 29 executes a failure diagnosis routine for exactly specifically identifying the position where abnormality arises (position where a failure arises), as an interruption processing associated with the aforementioned speed changing processing.

Specifically, when a series of processings to be executed in accordance with the aforementioned failure diagnosis routine as shown in FIG. 2 are started, the controller 6 determines based on the output NE from the engine rotation sensor 5 whether or not the engine is rotated and the hydraulic pump is actuated, in consideration of the result derived from the determination as to whether the engine speed NE exceeds a predetermined engine speed NES or not (step 101).

In a case where the result derived from the determination at the step 101 is NO, in other words, in a case where it is found that the engine speed NE is lower than the predetermined engine speed NES, the program goes to a step 116 (see FIG. 3) without any execution of subsequent processings (failure diagnosis processings). At the step 116, the controller 6 executes another routine different from a series of failure diagnosis processings.

In a case where the result derived from the determination at the step 101 is YES, in other words, in a case where it is found that the engine speed NE exceeds the predetermined engine speed NES, the controller 6 executes a series of failure diagnosis processings.

First, the controller 6 successively compares the content of the respective clutch pressure command signals $C_1$ to $C_7$ presently outputted from the output circuit 30 during the aforementioned speed changing processing with the content of the respective detection signals $S_1$ to $S_7$ of the clutch pressure sensors 19 to 25, with respect to each of the clutches H, L, R, 1st, 2nd, 3rd and 4th. Then, the controller 6 determines based on the results derived from the foregoing comparison whether the H/L clutches H and L and the SP clutches R, 1st, 2nd, 3rd and 4th are brought in an engaged state or released from the engaged state in conformity with the content representative of the command of the clutch pressure command signals $C_1$ to $C_7$. Concretely, in a case where it is found that the content representative of the respective clutch pressure command signals $C_1$ to $C_7$ is ON, the controller 6 executes a processing for determining whether or not the content representative of the detection signals $S_1$ to $S_7$ is ON in conformity with the ON command with respect to each of the clutches H, L, R, 1st, 2nd, 3rd and 4th (step 103). In addition, in a case where it is found that the content representative of the respective clutch pressure command signals $C_1$ to $C_7$ is OFF, the controller 6 executes a processing for determining whether or not the content representative of the respective detection signals $S_1$ to $S_7$ of the clutch pressure sensors 19 to 25 is OFF in conformity with the OFF command with respect to each of the clutches H, L, R, 1st, 2nd, 3rd and 4th (step 104).

Figure 4A:
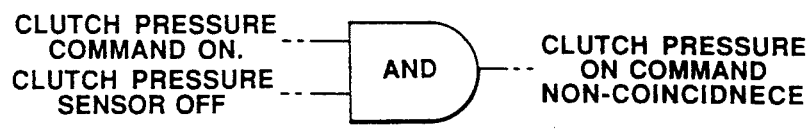
Figure 4B:
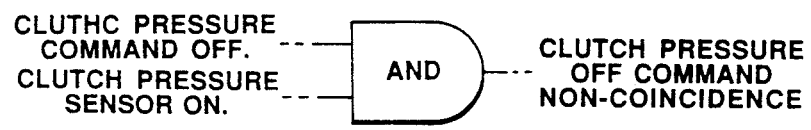

In a case where it is found that the practical clutch pressure is OFF in response to a clutch pressure ON command, the controller 6 determines that "the clutch pressure ON command is not coincident to the practical clutch pressure" (which represents that the result derived from the determination at the step 103 is YES (see FIG. 4(a)). Then, the content of specific identification of the clutch for which the foregoing determination has been made is stored in the RAM 28 in such a manner that e.g., "the clutch pressure ON signal is not coincident to the practical clutch pressure with respect to the H/L clutch L" (step 109). Similarly, in a case where it is found that the practical clutch pressure is ON in response to a clutch pressure OFF command, the controller 6 determines that "the clutch pressure OFF command is not coincident to the practical clutch pressure" (which represents that the result derived from the determination at the step 104 is YES (see FIG. 4(b)). Then, the content of specific identification of the clutch for which the foregoing determination has been made is memorized in the RAM 28 in such a manner that e.g., "the clutch pressure OFF command is not coincident to the practical clutch pressure with respect to the H/L clutch H" (step 110).

On the other hand, in a case where it is found that the practical clutch pressure is ON in response to a clutch ON command (which represents that the result derived from the determination at the step 103 is NO), and moreover, the practical clutch pressure is OFF in response to a clutch pressure OFF command is OFF (which represents that the result derived from the determination at the step 104 is NO) the controller 6 determines that the content representative of the commands of the clutch pressure command signals $C_1$ to $C_7$ is "coincident" to the practical engaged/disengaged state of each of the H/L clutches H and L and the SP clutches R, 1st, 2nd, 3rd and 4th.

At subsequent steps 105 and 106, the controller 6 determines, based on the content representative of the commands of the clutch pressure command signals $C_1$ to $C_7$ presently outputted from the output circuit 30 during the aforementioned speed changing processing, the output $N_{IN}$ from the transmission input shaft rotation sensor 9, the output $N_{MID}$ from the transmission intermediate shaft sensor 10 and the output $N_{OUT}$ from the transmission output shaft rotation sensor 11, whether or not the respective shafts 2a, 7a and 8a are rotated in conformity with the content representative of the respective commands of the clutch pressure command signals $C_1$ to $C_7$.

Table 2 shows a relationship between the H/L clutches H and L and a speed reduction ratio $G_{HL}$ of the auxiliary speed reduction unit 7 at the time when the H/L clutches are brought in an engaged state, and Table 3 shows a relationship between the SP clutches R, 1st, 2nd, 3rd and 4th and a speed reduction ratio $G_{SP}$ of the main speed reduction unit 8 at the time when the SP clutches R, 1st, 2nd, 3rd and 4th are brought in an engaged state.

TABLE 2

| H/L clutch | $G_{HL}$ |
|---|---|
| L | 1.00 |
| H | 0.74 |

TABLE 3

| SP clutch | $G_{SP}$ |
|---|---|
| R | 0.39 |
| 1st | 4.69 |
| 2nd | 3.33 |
| 3rd | 1.82 |
| 4th | 1.00 |

The controller 7 can determine whether or not the respective shafts 2a, 7a and 8a are rotated in conformity with the content representative of the clutch command signals $C_1$ to $C_7$, depending on the determination with respect to whether or not the respective shafts 2a, 7a and 8a are rotated in conformity with the speed reduction ratios corresponding to the H/L clutches and the SP clutches each of which engaged state is indicated in response to each of the clutch pressure command signals $C_1$ to $C_7$.

Then, the controller 7 reads from Table 2 the speed reduction ratio $G_{HL}$ of one of the H/L clutches of which content representative of either of the clutch pressure command signals $C_1$ and $C_2$ is ON, and thereafter, calculates a rotational speed deviation $\Delta HL$ appearing in the auxiliary speed reduction unit 7 in accordance with the following equation.

$$\Delta HL = |N\,IN - N\,MID \times G\,HL| \quad (1)$$

In addition, the controller 6 reads from Table 3 the speed reduction ratio $G_{SP}$ of one of the SP clutches of which content representative of one of the clutch pressure command signals $C_3$ to $C_7$ is ON, and thereafter, calculates a rotational deviation $\Delta SP$ appearing in the main speed changing unit 8 in accordance with the following equation.

$$\Delta SP = |N\,MID - N\,OUT \times G\,SP| \quad (2)$$

Additionally, the controller 6 calculates a rotational speed deviation $\Delta T/M$ appearing in the transmission 3 based on the speed reduction ratios $G_{HL}$ and $G_{SP}$ in accordance with the following equation.

$$\Delta T/M = |N\,IN - N\,OUT \times G\,HL \times G\,SP| \quad (3)$$

Subsequently, the controller 6 determines whether each of the rotational speed deviations $\Delta HL$, $\Delta SP$ and $\Delta T/M$ exceeds a threshold $N_s$ or not. This threshold $N_s$ is used as a threshold with which determination is made as to whether or not the input shaft 2a and the output shaft 7a of the auxiliary speed changing unit 7 are rotated in conformity with the aforementioned speed reduction ratio $G_{HL}$ or whether or not the input shaft 7a and the output shaft 8a of the main speed changing unit 8 are rotated in conformity with the aforementioned speed reduction ratio $G_{SP}$ or whether or not the input shaft 2a and the output shaft 8a of the transmission 3 are rotated in conformity with the aforementioned speed changing ratio $G_{HL} \times G_{SP}$. In practice, the threshold $N_s$ is predetermined in consideration of the performances of the transmission 3 and other factors. It should be noted that the threshold $N_s$ may be varied in dependence on each of the rotational speed deviations ΔHS, ΔSP and ΔT/M.

Figure 5A:
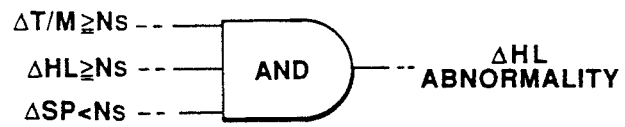
Figure 5B:
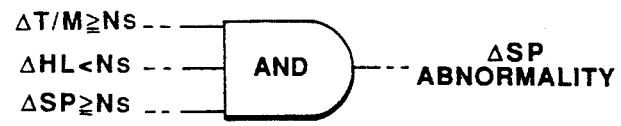
Figure 5C:
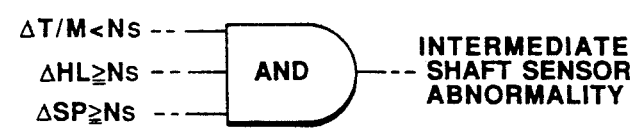
Figure 6:
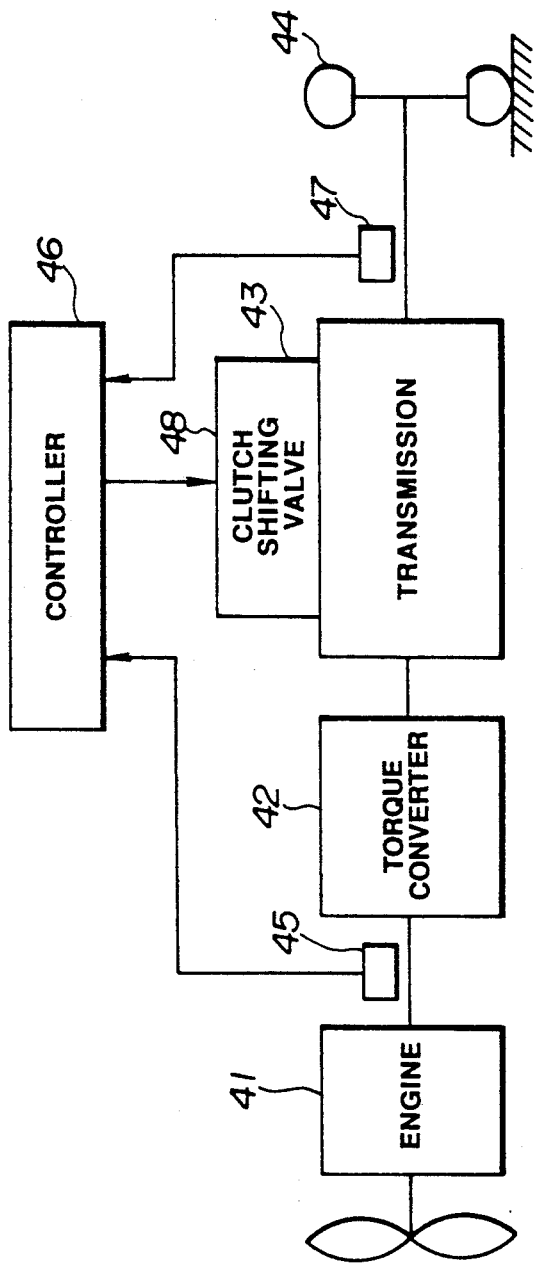
FIG. 6 is a block diagram which schematically illustrates the structure of a conventional apparatus for detecting abnormality in a speed changing system.
Figure 7:
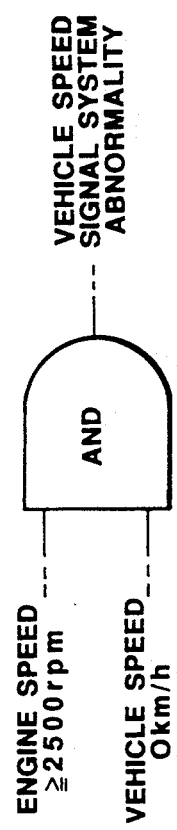
FIG. 7 is an illustrative view which shows determination to be executed by a controller in the conventional apparatus.

After the three kinds of determinations have been made in the above-described manner, the controller 6 makes another determination based on the results derived from the aforementioned determinations with respect to items as shown in FIG. 5(a) to FIG. 5(c).

In detail, as shown in FIG. 5(a), in a case where the rotational speed deviations ΔT/M and ΔHL are equal to or more than the threshold $N_S$ and the rotational speed deviation ΔSP is less than the threshold $N_S$, the controller 6 can determine that the input shaft 2a and the output shaft 7a of the auxiliary speed changing unit 7 are rotated in conformity with the speed reduction ratio $G_{HL}$ but the input shaft 7a and the output shaft 8a of the main speed changing unit 8 are not rotated in conformity with the speed reduction ratio $G_{SP}$. At this time, the content of the foregoing determination representing the aforementioned fact, i.e., "abnormality is present with respect to the rotational speed deviation ΔHL" is memorized in the RAM 28 (which represents that the result derived from the determination at the step 107 is YES, step 111).

In addition, as shown in FIG. 5(b), in a case where the rotational speed deviations ΔT/M and ΔSP are equal to or more than the threshold $N_S$ and the rotational speed deviation ΔHL is less than the threshold $N_S$, the controller 6 can determine that the input shaft 2a and the output shaft 7a of the the auxiliary speed changing unit 7 are rotated in conformity with the speed reduction ratio $G_{HL}$ but the input shaft 7a and the output shaft 8a of the main speed are not rotated in conformity with the speed reduction ratio $G_{SP}$. At this time, the content of the foregoing determination representing the aforementioned fact, i.e., "abnormality is present with respect to the rotational speed deviation ΔSP" is memorized in the RAM 28 (which represents that the result derived from the determination at the step S108 is YES, step 112).

Additionally, as shown in FIG. 5(c), in a case where the rotational speed deviations ΔHL and ΔSP are equal to or more than the threshold $N_S$ and the rotational speed deviation ΔT/M is less than the threshold $N_S$, the controller 6 can determine that the input shaft 2a and the output shaft 8a of the transmission 3 are rotated in conformity with the speed reduction ratio $G_{HL} \times G_{SP}$ and the rotational speed $N_{MIN}$ of the intermediate shaft 7a is abnormal. In other words, the controller 6 can determine that there occurs such a failure that abnormality arises with respect to the intermediate shaft rotation sensor 10. In this case, since there does not appears any trouble with respect to running of the engine, the controller 6 operates such that the present speed stage is held while the content of the present clutch pressure command signal outputted from the output circuit 30 is unchangeably maintained (step 106).

When the program goes to a step 113, the controller 6 makes determination with respect to the failure position in accordance with a failure position determining table shown in Table 4 with reference to the content of the following items memorized in the controller 6, one of them being an item which represents that "clutch pressure ON commands are not coincident to the practical clutch pressure", other one of them being an item which represents that clutch pressure OFF commands are not coincident to the practical clutch pressure", another one being an item which represents that "abnormality is present with respect to the rotational speed deviation ΔHL" and further another one of them being an item which represents that "abnormality is present with respect to the rotational speed deviation ΔSP".

TABLE 4

| | | | Rotation signal system | | | |
|---|---|---|---|---|---|---|
| | | | HL abnormal | | SP abnormal | |
| | | | Present | Absent | Present | Absent |
| Clutch pressure signal system | H/L clutches | Coincidence | (1)Abnormality in input shaft rotation sensor system (Electrical system) | (2)Normal | | |
| | | ON non-coincidence | (3)Abnormality 1 in HL clutch valves (Hydraulic system) | (4)Abnormality in Pressure sensor system (Electrical system) | | |
| | | OFF non-coincidence | (5)Abnormality 2 in HL clutch valves (Hydraulic system) | (6)Abnormality in pressure sensor system (Electrical system) | | |
| | SP clutches | Coincidence | | | (7)Abnormality in output shaft sensor system (Electrical system) | (8)Normal |
| | | ON non-coincidence | | | (9)Abnormality 1 in SP clutch valves | (10)Abnormality in pressure sensor |

TABLE 4-continued

| | Rotation signal system | | | |
|---|---|---|---|---|
| | HL abnormal | | SP abnormal | |
| | Present | Absent | Present | Absent |
| OFF non-coincidence | | | (Hydraulic system) (11) Abnormality 2 in SP clutch valves (Hydraulic system) | system (Electrical system) (12) Abnormality in pressure sensor system (Electrical system) |

Specifically, as is apparent from Table 4, the controller 6 makes determination in the following manner.

(1) In a case where the content of clutch pressure command signals with respect to the H/L clutches is "coincident" to the practically engaged state of each of the H/L clutches, and moreover, in a case where "abnormality is present with respect to the rotational speed deviation $\Delta HL$", since it is considered that there occurs such a malfunction that "abnormality is present with respect to the rotational speed deviation $\Delta HL$" merely due to an occurrence of abnormality of the input shaft rotation sensor 9 although the H/L clutches are brought in a normally engaged state, the controller 6 determines that there occurs such a failure that "abnormality arises with the input shaft rotation sensor 9".

(2) In a case where there is "coincidence" with respect to each of the H/L clutches, and moreover, in a case where the rotational speed deviation $\Delta HL$ is not abnormal, since there does not appear any problem, the controller 6 determines that the H/L clutches are "normal".

(3) In a case where "clutch pressure ON commands are not coincident to the practical clutch pressure" with respect to the H/L clutches and "abnormality is present with respect to the rotational speed deviation $\Delta HL$", since it is considered that "abnormality is present with respect to the rotational speed deviation $\Delta HL$" because the H/L clutches are not brought in a normally engaged state, the controller 6 determines that there occurs such a failure that "abnormality arises with respect to each of the H/L clutch valves 12 and 13".

(4) In a case where "clutch pressure ON commands are not coincident to the practical clutch pressure with respect to the H/L clutches" and the rotational speed deviation $\Delta HL$ is not abnormal, since it is considered that "clutch pressure ON commands are not coincident to the practical clutch pressure" because outputs $S_1$ and $S_2$ from the clutch pressure sensors 19 and 20 are abnormal, the controller 6 determines that there occurs such a failure that abnormality arises with each of the clutch pressure sensors 19 and 20".

(5) In a case where "clutch pressure OFF commands are not coincident to the practical clutch pressure" with respect to the H/L clutches and "abnormality is present with respect to the rotational speed abnormality $\Delta HL$", since it is considered that "abnormality is present with respect to the H/L clutches" because the H/L clutches are not released from their engaged state, the controller 6 determines that there occurs such a failure that "abnormality arises with each of the H/L clutch valves 12 and 13".

(6) In a case where "clutch pressure OFF commands are not coincident to the practical clutch pressure" with respect to the H/L clutches and the rotational speed deviation $\Delta HL$ is not abnormal, since it is considered that "clutch pressure OFF commands are not coincident to the practical clutch pressure" because outputs $S_1$ and $S_2$ from the clutch pressure sensors 19 and 20 are abnormal, the controller 6 determines that there occurs such a failure that "abnormality arises with each of the clutch pressure sensors 19 and 20".

Next, with respect to the SP clutches, the controller makes determination in the following manner.

(7) In a case where there is "coincidence" with respect to the SP clutches and "abnormality is present with respect to the rotational speed deviation $\Delta SP$", the controller 6 determines that there occurs such a failure that "abnormality arises with the output shaft rotation sensor 11".

(8) In a case where "there is "coincidence" with respect to the SP clutch 4 and the rotational speed deviation $\Delta SP$ is not abnormality, the controller 6 determines that all is "normal".

(9) In a case where "clutch pressure ON commands are not coincident to the practical clutch pressure" and "abnormality is present with respect to the rotational speed deviation $\Delta SP$", the controller 6 determines that there occurs such a failure that "abnormality arises with the SP clutch valves 14 to 18".

(10) In a case where "clutch pressure ON commands are not coincident to the practical clutch pressure" and the rotational speed deviation $\Delta SP$ is not abnormal, the controller 6 determines that there occurs such a failure that "abnormality arises with the clutch pressure sensors 21 to 25".

(11) In a case where "clutch pressure OFF commands are not coincident to the practical clutch pressure" and "abnormality is present with respect to the rotational speed deviation $\Delta SP$", the controller 6 determines there occurs such a failure that abnormality arises with the SP clutches 14 to 18".

(12) In a case where "clutch pressure OFF commands are not coincident to the practical clutch pressure" and the rotational speed deviation $\Delta SP$ is not abnormal, the controller 6 determines that "abnormality arises with the clutch pressure sensors 21 to 26".

As described above, with respect to the paragraphs (1) to (12), the controller 6 determines that there occurs some failure (or the controller 6 determines that all is normal) (step 113).

Next, in a case where the controller 6 determines that abnormality is present with respect to the H/L clutches valves 12 and 13, the clutch pressure sensors 19 and 20, the SP clutch valves 14 to 18 or the clutch pressure sensors 21 to 25 as mentioned above in the paragraphs (3), (4), (5), (6), (9), (10), (11) and (12), the controller 6 specifically identifies the position where a failure has arisen, based on the results derived from the determinations and the content of clutch pressure command signals $C_1$ to $C_7$ which are combined with each other.

For example, in a case where a clutch pressure command signal is outputted so as to allow the SP clutch R is brought in an engaged state (which represents that the content of the clutch pressure command signal $C_3$ is "ON"), and moreover, the controller 6 determines that a failure arises as described in the paragraph (9), the controller 6 specifically identifies the failure position such that the SP clutch valve 14 corresponding to the SP clutch R fails to operate properly (step 114).

Next, the controller 6 executes one of the following processings corresponding to the failure position based on the result derived from the determination on the failure position at the step 113 and the result derived from the specific identification of the failure position at the step 114.

(1) In a case where the controller 6 determines that there arises such a failure that abnormality is present with respect to the H/L clutch valves 12 and 13 or the SP clutch valves 14 to 18 (corresponding to the determinations as described in the paragraphs (3), (5), (9) and (11)), and moreover, the controller 6 specifically identifies the failure position, since it is inhibitive from the viewpoint of safety that running of the engine continues further while the presently selected speed stage is unchangeably maintained, the controller 6 executes a processing of outputting from the output circuit 30 a clutch pressure command signal for shifting the speed stage to a neutral stage N, i.e., a command signal for deleting all the contents of the clutch pressure command signals $C_1$ to $C_7$ regardless of the content of the clutch pressure command signal which has been presently outputted from the output circuit 30.

Otherwise, the controller 6 executes a processing of bringing in an engaged state a clutch pressure available for a clutch other than the specifically identified clutch as mentioned above and then selecting a speed stage nearest to the speed stage which has been presently selected. In other words, in a case where the present speed stage remains at a speed stage $F_2$ (at which the H/L clutch L and the SP clutch 2nd are operable) and the controller 6 specifically identifies as a failure position the SP clutch valve 15 corresponding to the SP clutch 2nd, the controller 6 cancels the engagement command which has been issued to the SP clutch 2nd. Thereafter, the controller 6 executes a processing of allowing a clutch pressure command signal to be outputted from the output circuit 30 so as to select a speed stage $F_1$ (at which the H/L clutch L and the SP clutch 1st are operable) which does not require that the SP clutch 2nd nearest to the speed stage $F_2$ is brought in an engaged state.

(2) In a case where the controller 6 determines that a failure arises in an electric system, i.e., abnormality is present with respect to the clutch pressure sensors 19 to 25 (corresponding to the determinations as described in the paragraphs (4), (6), (10) and (12)) or the controller 6 determines that abnormality is present with respect to the input shaft rotation sensor 9 or the output shaft rotation sensor 11 (corresponding to determinations at the paragraphs (1) and (7)), since no problem appears even through running of the engine continues further while the present speed stage is unchangeably maintained, the controller 6 outputs from the output circuit 30 the content of the clutch pressure command signal which has been presently outputted from the output circuit 30 as it is (step 115).

As is apparent from the above description, according to the embodiment of the present invention, the controller 6 determines whether or not the H/L clutches and the SP clutches are properly brought in an engaged state in conformity with the clutch pressure commands. In addition, the controller 6 determines whether or not the H/L clutches and the SP clutches are properly selected and then brought in an engaged state and the respective shafts located before and behind the H/L clutches and the SP clutches are rotated in conformity with the speed reduction ratios corresponding to the H/L clutches and the SP clutches which have been selected in that way. At this time, the controller 6 exactly specifically identifies based on the results derived from the aforementioned determinations the position in the speed changing system where a failure arises in an electrical system (signal system) or a mechanical system (hydraulic system).

In connection with the aforementioned points, since the conventional apparatus is constructed such that the controller generally specifically identifies the position where a failure arises on the assumption that a transmission shifting valve is properly actuated in conformity with a clutch pressure command so that a speed changing clutch is properly brought in an engaged state, it has drawbacks that it is short of accuracy and it is inferior in respect of reliability. In contrast with the conventional apparatus, the apparatus in accordance with the embodiment of the present invention has an advantageous effect that its reliability is improved substantially.

In addition, since any failed part in the apparatus is quickly repaired in response to an information on the position where a failure has arisen, other advantageous effect of the present invention is that a performance of services to be rendered for the apparatus is improved remarkably.

Additionally, since it is possible that the apparatus continues running of the engine further while the present speed stage is unchangeably maintained or it is shifted to another available speed stage when the controller determines based on an information on the failure position that there is few possibility that a movement machine or a construction machine is exposed to danger, another advantageous effect of the present invention is that an operational effect of the movement machine or the construction machine is improved remarkably.

The present invention has been described above with respect to the embodiment wherein it is presumed that a speed changing system for selecting a speed stage by combining the H/L clutches with the SP clutches arranged in the two-staged speed changing unit is employed for the apparatus of the present invention. However, it should of course be understood that the present invention should not be limited only to this embodiment. The present invention may equally be applied to a system in which a speed changing operation is performed with the aid of a single-staged speed changing unit or a speed changing unit having three or more stages.

In addition, the present invention has been described above with respect to the embodiment wherein it is presumed that a controlling operation is performed such that the H/L clutches and the SP clutches (speed changing clutches) are released from their engaged state by actuating hydraulic units. However, the present invention should not be limited only to this embodiment. Alternatively, the present invention may equally be applied to a case where a controlling operation is performed by actuating pneumatic units or a case where various types of speed changing clutches such as mechanical type clutches are employed for the apparatus.

According to the embodiment of the present invention, the controller detects with the aid of pressure sensors whether the respective speed changing clutches are brought in an engaged state or not. Alternatively, the present invention, of course, may be carried out by employing displacement sensors, load cells or similar sensors, provided that it is proven that they can detect whether the respective speed changing clutches are brought in an engaged state or not.

It should be noted that the present invention, of course, be applied not only to an automatic speed changing system in which an optimum speed changing stage is selected by selecting one of speed stage ranges (e.g., R, N, 3, 2, 1) (wherein an optimum speed stage is selected among from speed stages $F_2$ to $F_8$ when e.g., the speed stage range 3 is selected from the foregoing speed stage ranges) but also a manual speed changing system in which one of the speed stages is determined in accordance with an operator's intention.

Additionally, the present invention has been described above with respect to the embodiment wherein a processing of maintaining a speed stage based on the result derived from the determination on the position where a failure arises is executed automatically. However, the present invention should not be limited only to this embodiment. Alternatively, the present invention, of course, be carried out by adequately neglecting processings to be executed automatically. Further, the present invention may be carried out by manually executing the aforementioned processings (operator's actuations) in such a manner that the results derived from determinations can be indicated on a display device which is constructed by a cathode ray tube, a liquid crystal and others.

As described above, according to the present invention, since the apparatus assures that the position where abnormality arises in the speed changing system can specifically be identified with excellent accuracy, reliability of the apparatus, a performance of services to be rendered for a vehicle or the like having the apparatus installed thereon and an operational efficiency of the vehicle can be improved substantially.

INDUSTRIAL APPLICABILITY

As is readily apparent from the above description, the apparatus for detecting abnormality in a speed changing system in accordance with the present invention is preferably employable for a vehicle such as a construction machine or the like including a speed changing system, since the position where abnormality arises can specifically be identified with excellent accuracy using the apparatus of the present invention.

We claim:

1. An apparatus for detecting abnormality in a speed changing system including a transmission composed of a plurality of speed changing clutches to perform a speed changing operation in response to a speed stage command so as to select one of said speed changing clutches and then bring them in an engaged state, characterized in that said apparatus comprises;

clutch engaged state detecting means arranged independently of said speed changing clutches to detect whether said speed changing clutch is brought in an- engaged state or not, rotational speed detecting means for detecting a rotational speed of each of shafts located before and behind said speed changing clutches, clutch engaged state determining means for determining based on the content of said speed stage command in response to an output from said clutch engaged state detecting means with respect to each of said speed changing clutches whether or not said speed changing clutch is brought in an engaged state in conformity with the content of said speed stage command, rotational speed determining means for determining based on the content of said speed stage command in response to an output from said rotational speed detecting means whether or not one of said shafts located before and behind said speed changing clutches is rotated at a speed reduction ratio corresponding to said speed changing clutch which has been selected and then brought in an engaged state in conformity with the content of said speed stage command, and means for detecting based on the results derived from the determinations of said clutch engaged state determining means and said rotational speed determining means the position where said abnormality has arisen in said speed changing system.

2. An apparatus for detecting abnormality in a speed changing system as claimed in claim 1, characterized in that said transmission includes an auxiliary speed changing clutch located at a first stage as seen from an input shaft of said transmission and a main speed changing clutch located at a second stage as seen from the same, and that said speed changing system is a system for performing a speed changing operation in response to said speed stage command while said auxiliary speed changing clutch is combined with said main speed changing clutch.

3. An apparatus for detecting abnormality in a speed changing system as claimed in claim 2, characterized in that said rotational speed detecting means serves to detect a rotational speed of said input shaft of said transmission, a rotational speed of an intermediate shaft disposed between said auxiliary speed changing clutch and said main speed changing clutch and a rotational speed of an output shaft of said transmission.

* * * * *